United States Patent [19]
Dietz

[11] Patent Number: 4,559,481
[45] Date of Patent: Dec. 17, 1985

[54] RASTER WIDTH REGULATION CIRCUIT

[75] Inventor: Wolfgang F. W. Dietz, New Hope, Pa.

[73] Assignee: RCA Corporation, Princeton, N.J.

[21] Appl. No.: 676,947

[22] Filed: Nov. 30, 1984

[51] Int. Cl.[4] .............................................. H01J 29/70
[52] U.S. Cl. .................................... 315/411; 315/370
[58] Field of Search ............... 315/399, 408, 411, 370, 315/388

[56] References Cited

U.S. PATENT DOCUMENTS 4,414,494  11/1983  Schmidt ............................... 315/395

*Primary Examiner*—Theodore M. Blum
*Attorney, Agent, or Firm*—Eugene M. Whitacre; Paul J. Rasmussen; Joseph J. Laks

[57] ABSTRACT

A line deflection voltage regulator develops a regulated scan supply voltage. A line deflection circuit is coupled to the voltage regulator for generating line scanning current in a line deflection winding. The amplitude of the scanning current is dependent on the magnitude of the regulated scan supply voltage. A high voltage regulator develops a second regulated voltage. A high voltage generator is coupled to the high voltage regulator for generating an ultor output voltage at an ultor terminal. The magnitude of the ultor output voltage is dependent on the second regulated voltage. A high voltage control circuit is coupled in a feedback path between the high voltage generator and the high voltage regulator for developing a first ultor control voltage that is representative of the ultor output voltage to regulate the ultor output voltage. A second ultor control voltage that is representative of fluctuations in the ultor output voltage is developed at a point within the feedback path. The second control voltage is coupled to the line deflection voltage regulator for varying the regulated scan supply voltage to provide raster width regulation.

12 Claims, 1 Drawing Figure

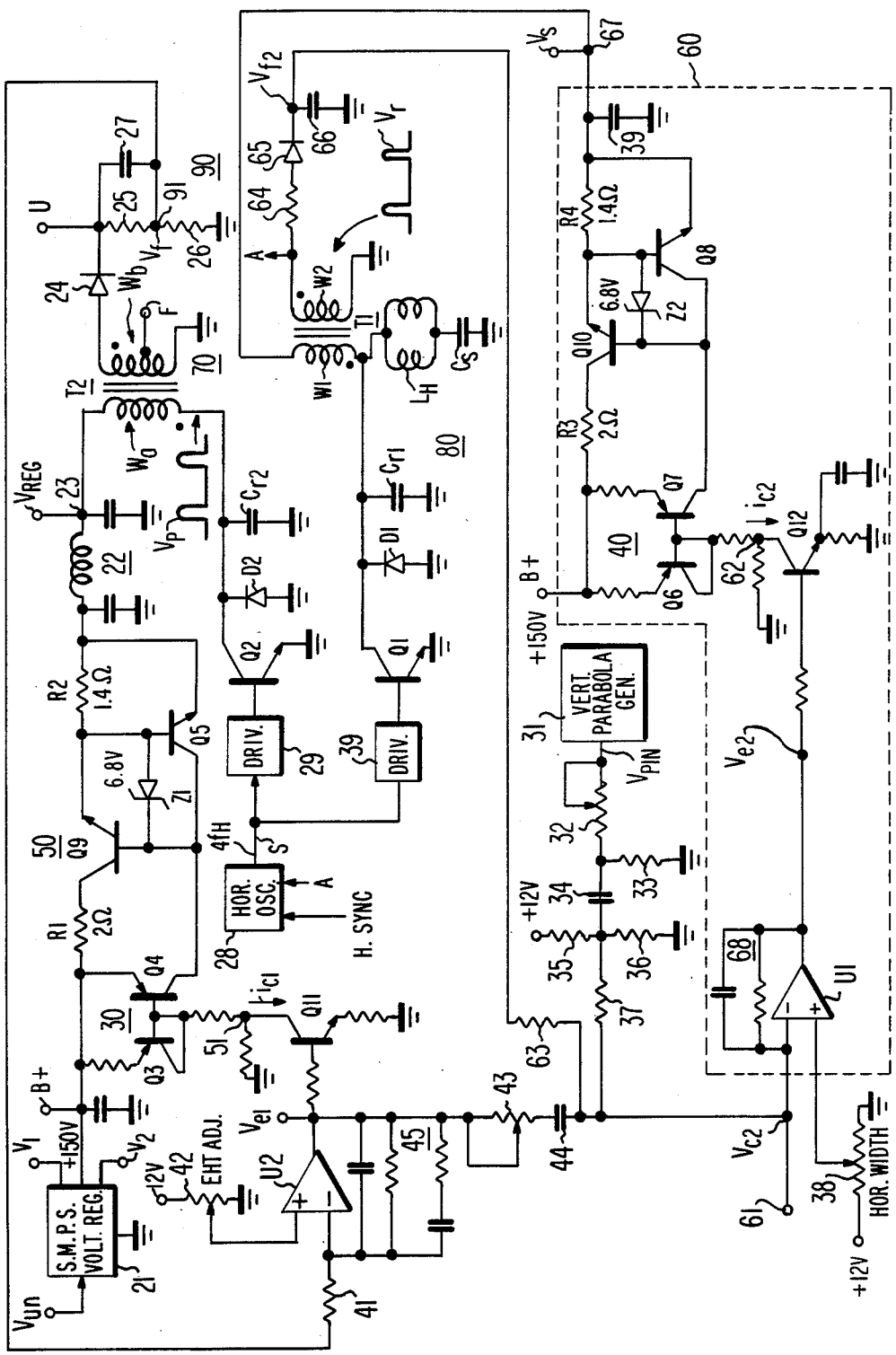

RASTER WIDTH REGULATION CIRCUIT

This invention relates to raster width regulation in a television display system.

High resolution video display monitors are used to display computer graphics information in such systems as computer aided design and computer aided manufacturing systems. In such high resolution display systems, it is desirable to minimize, to the greatest extent practical, display distortion of the video graphics or other information.

One source of display distortion is raster width distortion due to variations in horizontal or line deflection sensitivity. Line deflection sensitivity depends on the magnitude of the ultor voltage being supplied to the final anode electrode of the picture tube in display monitor and depends upon the amplitude of the line scanning current. The amount of electron beam line deflection or throw angle increases with decreasing ultor voltage and with increasing line scanning current amplitude.

Beam current loading of the ultor terminal varies with changes in the information content of the video signal. Bright display areas produce increased beam current loading of the ultor terminal, whereas dark display areas produce reduced beam current loading. Increased beam current loading of the ultor terminal tends to decrease the ultor output voltage and therefor tends to undersirably increase the amount of electron beam line deflection and raster width.

It is a feature of the invention to provide compensation for undesirable raster width variations that tend to produce distortion of the displayed video information. It is another feature of the invention to provide fine or accurate raster width compensation or regulation that satisfies the stringent requirements of a high resolution display system.

In accordance with an aspect of the invention, apparatus for regulating raster width includes a line deflection voltage regulator that is responsive to control signals for developing a first regulated voltage. A line deflection circuit is coupled to the line deflection voltage regulator for generating line scanning current in a line deflection winding. The amplitude of the scanning current is dependent on the first regulated voltage. A high voltage regulator is responsive to control signals for developing a second regulated voltage. A high voltage generator is coupled to the high voltage regulator for generating a ultor output voltage at an ultor terminal. The magnitude of the ultor output voltage is dependent on the second regulated voltage. A high voltage control circuit is coupled in a feedback path between the high voltage generator and the high voltage regulator for developing a first ultor control signal that is representative of the ultor output voltage to regulate the ultor output voltage. A voltage developing circuit is coupled to the feedback path for developing a second ultor control signal that is representative of fluctuations in ultor output voltage. The second control signal is applied to the line deflection voltage regulator to vary the first regulated voltage for providing raster width regulation.

As an added feature of the invention, by having a separate high voltage generator to develop the ultor voltage, rather than requiring the line deflection circuit to develop the ultor voltage, beam current loading of the ultor terminal does not produce concurrent direct loading of the line deflection circuit. Undesirable interaction is avoided, between the high voltage generator and the line deflection circuit, that tends to undesirably affect raster width regulation.

As another feature of the invention, the provision of a high voltage regulator and a separate line deflection voltage regulator enables separate, relatively independent control of two factors that determine deflection sensitivity, namely, the magnitude of the ultor voltage and the amplitude of the line scanning current. Thus, by supplying the line voltage regulator with a control voltage representative of ultor output voltage fluctuations, the amplitude of the scanning current may be varied to provide accurate raster width regulation to compensate for residual ultor voltage fluctuations that remain uncancelled by operation of the high voltage regulator.

The sole FIGURE illustrates a regulated high voltage generator and regulated line deflection circuit with raster width control, embodying the invention.

In the FIGURE, a switched mode power supply regulator 21 generates regulated supply voltages from an unregulated, mains derived voltage $V_{un}$ for providing power to various circuits in a video display monitor. For example, voltage regulator 21 develops a regulated B+ direct voltage for providing power to a high voltage generator 70 and to a line deflection circuit 80. Voltage regulator 21 also develops a regulated voltage $V_1$ for providing power to such circuits as the vertical deflection and picture tube driver circuits, not illustrated in the FIGURE, and a regulated supply voltage $V_2$ for providing power to small signal circuits such as the video processing circuits, also not illustrated in the FIGURE.

Line deflection circuit 80 includes a horizontal oscillator 28 providing switching signals S, repeating at the line deflection frequency of, illustratively, 4fH, where fH is the standard line deflection frequency of, for example, 15.75 kilohertz. Switching signals S are coupled to a driver stage 39 to produce line rate switching of a horizontal output transistor Q1 for generating line scanning current in a line deflection winding $L_H$. Additionally, line deflection circuit 80 includes a damper diode D1, a deflection retrace capacitor $C_{r1}$ and includes an S-shaping or trace capacitor $C_s$ coupled in series with line deflection winding $L_H$.

Line deflection winding $L_H$ is coupled to a source of regulated scan supply voltage $V_s$ via the primary winding W1 of a flyback transformer T1. Regulated scan supply voltage $V_s$ is developed from the B+ voltage by a line deflection voltage regulator 60. The average value of the trace voltage developed across trace capacitor $C_s$ is substantially equal to the magnitude of the regulated scan supply voltage $V_s$. Since the peak to peak amplitude of the scanning current is proportional to the average trace voltage being developed by trace capacitor $C_s$, the amplitude of the scanning current is made dependent on the magnitude of the regulated scan supply voltage $V_s$.

The deflection retrace pulse voltage developed across line deflection winding $L_H$ is applied to primary winding W1 of flyback transformer T1 to generate a deflection retrace pulse voltage $V_r$ in a secondary winding W2 of the transformer. Retrace pulse voltage $V_r$ is coupled to horizontal oscillator 28 as is a horizontal sync signal obtained from a source of video signals, not illustrated in the FIGURE. Operation of horizontal oscillator 28 is controlled to synchronize raster line deflection with the raster display of the picture content in the video signals.

In accordance with an inventive feature, the function of high voltage generation is separated from the function of line deflection, with high voltage generator 70 being provided with its own power transformer T2. This arrangement eliminates the need for flyback transformer T1 and line deflection circuit 80 to supply power to the picture tube ultor load. Additionally, switched mode power supply 21 is the power source for the other high power monitor load circuits, such as the vertical deflection and picture tube driver circuits. Therefore, line deflection circuit 80 does not exhibit undesirable retrace pulse voltage load current modulation that could undesirably produce raster line distortion. No heavy, variable loading occurs on the retrace pulse voltage developed by line deflection winding $L_H$.

High voltage generator 70 comprises a switching power supply, operating on the same pulse principles as line deflection circuit 80, to produce a pulse voltage $V_p$ at the dotted terminal of the primary winding $W_a$ of high voltage transformer T2. The voltage $V_p$ is stepped up by secondary winding $W_b$, and the pulse portion of the voltage is rectified by a diode 24 to generate the DC ultor output voltage at terminal U.

To generate the pulse voltage $V_p$ high voltage generator 70 includes an output switching transistor Q2 switched at, for example, the line deflection frequency by a driver 29 that receives the horizontal switching signals S from horizontal oscillator 28. Paralleling output switching transistor Q2 is a damper diode D2 and a resonanting capacitor $C_{r2}$ having a function analogous to that of deflection retrace capacitor $C_{r1}$.

High voltage transformer T2 is operated in a flyback converter mode, with the inductance of primary winding $W_a$ serving as the inductance that resonants with capacitor $C_{r2}$ when transistor Q2 is cutoff by driver 29. The pulse voltage $V_p$ is generated by a half-cycle resonant oscillation of the resonant circuit formed by winding $W_a$ and capacitor $C_{r2}$. The resonant oscillation is terminated by conduction of damper diode D2. The amplitudes of the pulse voltage $V_p$ and the ultor voltage developed at terminal U are related to the magnitude of the regulated supply voltage $V_{reg}$ developed by a high voltage regulator 50 at an output terminal 23 that is coupled to primary winding $W_a$ of high voltage transformer T2.

High voltage regulator 50 comprises, for example, a series-pass regulator with the collector of a series-pass transistor Q9 coupled to the B+ terminal via a current limiting resistor R1 and with the emitter coupled to output terminal 23 via an overcurrent sampling resistor R2 and an LC filter network 22.

The base and emitter electrodes of an overcurrent limiting transistor Q5 are coupled to respective end terminals of sampling resistors R2. The collector electrode of transistor Q5 is coupled to the base of transistor Q9.

A controllable current source 30 provides base current to series-pass regulating transistor Q9 for controlling conduction of the transistor under normal operating conditions in accordance with a control signal current $i_{c1}$ flowing from a control input terminal 51. Controllable current source 30 comprises transistors Q3 and Q4 configured as a current mirror, with the base terminals of the current mirror transistors being coupled in common to control terminal 51. The output of controllable source 30 at the collector of current mirror transistor Q4 is coupled to the base of series-pass transistor Q9.

A base current for controlling conduction in series-pass transistor Q9 is supplied from controllable current source 30 in accordance with the value of the control current $i_{c1}$ being sunk by a control transistor Q11. Increasing control current $i_{c1}$, for example, increases the current supplied to the base of series-pass transistor Q9. The conduction of transistor Q9 thereby increases, increasing the amount of current being supplied to output terminal 23.

Excessive current may flow from terminal 23 into winding $W_a$ of transformer T2, such as may occur under fault operating conditions where, for example, output switching transistor Q2 becomes a short circuit or where picture tube arcing results in excessive current flowing from ultor terminal U. The excessive current flowing from terminal 23 generates a sufficient voltage across sampling resistor R2 to turn on overcurrent limiting transistor Q5. Current from controllable source 30 is shunted away from the base of transistor Q9 by the conduction of transistor Q5 to limit conduction in the series-pass transistor, thereby limiting the amount of current flowing from terminal 23. A zener diode Z1 is coupled between the base and emitter electrodes of series-pass transistor Q9 to prevent an excessive forward biasing voltage from being developed across the base-emitter junction of transistor Q9 during overload conduction of transistor Q5.

To enable high voltage regulator 50 to provide regulation of the ultor voltage at terminal U, control transistor Q11 is a circuit element in a negative feedback path that couples the output of high voltage generator 70, at terminal U, for example, to the control input terminal 51 of high voltage regulator 50. The circuit elements of the feedback path include a voltage divider 90, coupled to ultor terminal U, and a comparator U2 having an inverting input terminal coupled to a junction terminal 91 of voltage divider 90 and having an output terminal coupled to control transistor Q11.

In operation, feedback voltage $V_f$ is applied to the inverting input terminal of comparator U2. Feedback voltage $V_f$ is representative of the ultor voltage being developed at terminal U. When the ultor voltage increases, for example, so does feedback voltage $V_f$. The error voltage $V_{e1}$, developed at the output of comparator U2, decreases, decreasing conduction in control transistor Q11. Ultor control current $i_{c1}$ decreases, decreasing conduction in controllable current source 30 to decrease conduction in series-pass regulator transistor Q9. The regulated supply voltage $V_{reg}$ decreases, decreasing the amplitude of the pulse voltage $V_p$, to thereby decrease the ultor voltage and compensate for the tendency of the ultor voltage to increase.

An adjustable DC control voltage, developed at the wiper arm of an extra high tension adjust potentiometer 42, is coupled to the noninverting input terminal of comparator U2 to adjust the magnitude of the ultor voltage.

Voltage divider 90 includes resistive voltage dividing elements, resistor 25 and resistor 26, that produce the DC and long term average value of the feedback voltage $V_f$ that represents the DC and long term average value of the ultor voltage. Voltage divider junction terminal 91 is DC coupled to the inverting input terminal of comparator U2 via a resistor 41. Thus, changes in the DC and long term average value of the ultor voltage that are sensed by voltage dividing resistors 25 and 26 are preserved in the feedback path as the DC and long term average changes in the error voltage $V_{el}$ that biases the base of control transistor Q11. Thus, high voltage regulator 50 is capable of responding to changes in the DC level and long term average value changes of the ultor voltage, to vary the regulated supply voltage $V_{reg}$ accordingly, to maintain a constant ultor voltage.

Changes in the long term average value of the ultor voltage may occur due to long term beam current loading of ultor terminal U due to changes in the overall or average brightness of a picture scene being displayed on the raster. Such overall or average brightness changes occur over the interval of several video field periods or field deflection cycles. If left uncompensated, these long term average value changes in the ultor voltage produce a visually undesirable pulsation of the width of the entire raster.

A second type of raster distortion is one that is caused by short term fluctuations in the ultor voltage. The duration of such short term fluctuations is typically less than one field period or less than one vertical deflection cycle. Such short term fluctuations in the ultor voltage may be caused by short term fluctuations in beam current loading of ultor terminal U when displaying, for example, a stationary picture scene that include both very bright picture regions and very dark picture regions. As the video lines for such a stationary scene are displayed within one field, they will vary from lines that display bright picture information to lines that display dark picture information. These rapid changes in display of video information produce corresponding rapid fluctuations in beam current loading and in ultor voltage over one field interval. The result is that the width of the raster lines within one field also fluctuates in a corresponding manner to distort the display.

In accordance with an inventive aspect, high voltage regulator 50 is also responsive to the short term fluctuations in ultor output voltage to correct for these fluctuations and maintain a relatively constant ultor voltage. In carrying out this aspect of the invention, voltage divider 90 includes a capacitor 27 coupled between voltage divider junction terminal 91 and ultor terminal U. Short term fluctuations in the ultor voltage are directly coupled, relatively unattenuated, to terminal 91 to develop short term fluctuations in the feedback voltage $V_f$.

The short term fluctuations in the feedback voltage $V_f$ are then coupled to the inverting input terminal of comparator U2 to develop a component of the error voltage $V_{e1}$ at the output of the comparator that enables the control current $i_{c1}$ to provide, as explained later, substantial, not necessarily total, cancellation of the ultor voltage fluctuations at ultor terminal U. The time constant associated with voltage divider network 90 is matched to the time constant of the RC network 45 coupled between the output and inverting input terminals of comparator U2 to enable the comparator to respond to short term ultor voltage fluctuations while still maintaining stable operation without going into undesirable parasitic oscillation.

In accordance with another aspect of the invention, line deflection voltage regulator 60 is also responsive to the ultor output voltage to vary the regulated scan supply voltage $V_s$ in accordance with the ultor output voltage. Line deflection regulator 60 includes a series-pass transistor Q10 coupled between the regulated B+ terminal and output terminal 67 at which the regulated voltage $V_s$ is developed. Series-pass transistor Q10, and its associated control circuitry, operates in a manner identical to series-pass transistor Q9 of high voltage regulator 50. Thus, line deflection voltage regulator 60 includes a current limiting resistor R3, a current sampling resistor R4, a filter 39, an overcurrent limiting transistor Q8 and associated zener diode Z2, and a controllable current source 40. Current source 40 includes a current mirror transistor Q6 and includes a current mirror transistor Q7 that supplies base current to series-pass transistor Q10 in accordance with a control signal $i_{c2}$ that flows from a control terminal 62 and that is developed by a control transistor Q12. Conduction in control transistor Q12 is controlled by a error voltage $V_{e2}$ developed at the output of a comparator U1 that in turn is responsive to a control voltage $V_{c2}$ being developed at a control input terminal 61 of regulator 60.

Control input terminal 61 is the summing point for various control signals that are used to regulate the scan supply voltage $V_s$. A feedback voltage $V_{f2}$ is applied to control input terminal 61 via resistor 63 to provide a closed loop negative feedback that maintains a constant deflection retrace pulse amplitude with variations in the frequency of horizontal switching signal S and with residual ripple in the B+ voltage that remains uncorrected by switched mode power supply 21. The feedback voltage $V_{f2}$ is obtained from the retrace pulse voltage $V_r$ that is coupled to a diode 65 via a current limiting resistor 64 and that is then filtered by a capacitor 66.

A second control voltage applied to control input terminal 61 is obtained from a vertical parabola generator 31, of well-know design. Vertical parabola generator 31 supplies a side pincushion correction voltage $V_{pin}$ that is AC coupled by a capacitor 34 via a resistor 37 to terminal 61, after first being divided down in amplitude by voltage dividing resistors 32 and 33. Additional DC bias for the inverting input terminal of comparator U1 is provided by voltage dividing resistors 35 and 36 coupled to a +12V source. The pincushion correction signal $V_{pin}$ produces a vertical rate variation of the scan supply voltage $V_s$ to achieve side pincushion correction of the raster.

To control horizontal width of the raster, an adjustable DC control voltage is developed at the wiper arm of a potentiometer 38 and is coupled to the noninverting input terminal of comparator U1.

In accordance with a feature of the invention, line deflection voltage regulator 60 is made responsive to fluctuations in the ultor output voltage to achieve highly accurate raster width compensation. Depending on the loop gain for the ultor feedback voltage $V_f$ in the feedback path of high voltage regulator 50, some residual ultor voltage error and raster distortion remain uncompensated by high voltage regulator 50. This distortion may be especially objectionable when displaying high resolution computer graphics, for example, where short term beam current loading fluctuations, described previously, produce short term ultor voltage fluctuations.

To correct for the residual distortion, the error voltage $V_{e1}$ developed at the output of comparator U2 of high voltage regulator 50 is AC coupled to summing point 61 of line deflection voltage regulator 60 via a resistor 43 and a capacitor 44. The DC and long term average changes in the ultor voltage at terminal U establish the DC and long term average value of the error voltage $V_{e1}$. The short term ultor voltage fluctuations establishes a corresponding short term AC fluctuation in the error voltage $V_{e1}$. It is this short term fluctuation that is coupled by resistor 43 and capacitor 44 to control input terminal 61 of line deflection voltage regulator 60.

The regulated scan supply voltage $V_s$ is varied in accordance with these ultor voltage fluctuations in a manner that compensates for the remaining raster distortion produced by the short term fluctuations that remain uncompensated by high voltage regulator 50. The time constant associated with resistor 43 and capacitor 44 is selected to pass on these short term fluctuations to control terminal 61. The time constant is also matched to the time constant associated with RC network 68 that is coupled between the output and inverting input terminals of comparator U1.

Assume, for example, that the ultor output voltage fluctuation is in the direction to decrease the ultor voltage. This decrease tends to increase the raster width. The accompanying decrease in ultor feedback voltage $V_f$ is coupled to inverting input terminal of comparator U2 to produce an increase in the error voltage $V_{e1}$. The increase in error voltage $V_{e1}$ is coupled to the inverting input terminal of comparator U1 of line deflection voltage regulator 60 to decrease the error voltage $V_{e2}$. The control current $i_{c2}$ thereby decreases decreasing conduction in series-pass transistor Q10. The decrease in conduction of series-pass transistor Q10 produces a decrease in the regulated scan supply voltage $V_s$ and therefore a decrease in the amplitude of the line scanning current. The decrease in amplitude of the line scanning current decreases the width of the raster lines as compensation for the tendency of the raster lines to increase with a decrease in ultor voltage.

An advantage of using the output of high voltage regulator comparator U2 as the input to line deflection voltage regulator comparator U1 to provide the mechanism for additional raster width correction, is that the impedances between the output terminal of comparator U2 and the input terminal of comparator U1 may be readily matched and proper signal bias levels may be readily achieved.

An alternate way of obtaining ultor feedback voltage $V_f$ is from a focus electrode voltage that is derived from the resonant pulse voltage being developed at a focus tap terminal F in winding $W_b$ of high voltage transformer T2. The pulse voltage in winding $W_b$ that generates the focus electrode voltage may be used to generate the feedback voltage $V_f$, provided that beam current loading on ultor terminal U produces the same type of ringing and other waveshape distortion of the pulse voltage at tap terminal F as is produced across the entire high voltage secondary winding $W_b$.

It is desirable to use an ultor sense voltage that is directly representative of the ultor voltage, such as ultor feedback voltage $V_f$ that is obtained from junction terminal 91 coupled to ultor terminal U. Such a sense voltage is a direct representation of ultor voltage fluctuations and may be advantageously used to enable line deflection voltage regulator 60 to directly follow such fluctuations.

It is desirable to use such a direct representation sense voltage to permit the amplitude of the line scanning current to track the fluctuations in ultor voltage. Such tracking is necessary to maintain a constant deflection sensitivity. For example, for a relatively small fluctuation, $\delta U$, in the ultor voltage, the change in amplitude $\delta I_P$ of the line scanning current should be directly proportional to the ultor voltage fluctuation $\delta U$ to maintain a constant deflection sensitivity. Changes in the ultor feedback voltage $V_f$ are directly related to the ultor voltage fluctuations. Feedback voltage $V_f$ provides a good sense signal for use by line deflection regulator 60 to produce the necessary changes in scan supply voltage $V_s$ that produce the required changes $\delta I_P$ in the amplitude of the line scanning current.

Using a sampling resistor in the current path of high voltage winding $W_b$ to provide an indirect representation of fluctuations of the ultor voltage U may not provide satisfactory representation because the tracking between the voltage changes across the sampling resistor and the ultor voltage fluctuation $\delta U$ may not be adequate. Such inadequacy may be due in part to the fact that the leakage inductance exhibited by the large number of turns in high voltage winding $W_b$ combined with possibly inadequate filtering by the ultor capacitance result in an internal generator impedance that causes the ultor voltage to vary in a manner different than that of the current variations in the sampling resistor.

What is claimed is:

1. Apparatus for regulating raster width, comprising:
   a line deflection voltage regulator responsive to control signals for developing a first regulated voltage;
   a line deflection circuit coupled to said line deflection voltage regulator for generating line scanning current in a line deflection winding, the amplitude of said scanning current being dependent on said first regulated voltage;
   a high voltage regulator responsive to control signals for developing a second regulated voltage;
   a high voltage generator coupled to said high voltage regulator for generating an ultor output voltage at an ultor terminal, the magnitude of said ultor output voltage being dependent on said second regulated voltage;
   means coupled in a feedback path between said high voltage generator and said high voltage regulator for developing a first ultor control signal for said high voltage regulator that is representative of ultor output voltage to regulate said ultor output voltage; and
   means coupled to said feedback path for developing a second ultor control signal for said line deflection voltage regulator that is representative of fluctuations in said ultor output voltage to vary said first regulated voltage in accordance therewith for providing raster width regulation.

2. Apparatus according to claim 1 wherein said second ultor control signal is representative of ultor output voltage fluctuations that remain uncancelled by said high voltage regulator.

3. Apparatus according to claim 1 wherein said first ultor control signal developing means includes a comparator having an output coupled to a control input of said high voltage regulator and having an input for receiving a feedback voltage representative of said ultor output voltage.

4. Apparatus according to claim 3 including a resistive voltage divider coupled to said ultor terminal for developing said feedback voltage at a junction terminal thereof.

5. Apparatus according to claim 4 including a capacitance coupled to said ultor terminal and to said junction terminal for enabling said comparator to respond to relatively rapid fluctuations in said ultor output voltage.

6. Apparatus according to claim 3 wherein said second ultor control signal developing means is responsive to the output of said comparator for developing therefrom said second ultor control signal.

7. Apparatus according to claim 6 including a voltage divider coupled to said ultor terminal for developing said feedback voltage at a junction terminal thereof.

8. Apparatus according to claim 1 including a third voltage regulator for generating a regulated supply voltage from an unregulated input voltage, said line deflection and high voltage regulators developing their respective regulated voltages from said third voltage regulator.

9. Apparatus according to claim 8 wherein said high voltage generator comprises switching means coupled to a first winding of a high voltage transformer, said ultor output voltage being generated from the voltage developed across a second winding of said transformer.

10. Apparatus according to claim 9 wherein said line deflection circuit is coupled to said line deflection regulator via a second transformer having a retrace pulse voltage developed therein by said line deflection winding.

11. Apparatus according to claim 10 including means for developing a control signal for said line deflection regulator representative of the amplitude of said retrace pulse voltage for varying said first regulated voltage to maintain a regulated retrace pulse voltage.

12. Apparatus according to claim 11 including a vertical rate signal generator for developing a vertical rate control signal for said line deflection voltage regulator to vary said first regulated voltage in a manner that provides side pincushion correction.

* * * * *